US012720350B2

(12) United States Patent
Svendsen et al.

(10) Patent No.: US 12,720,350 B2
(45) Date of Patent: Aug. 25, 2026

(54) METHODS, APPARATUSES AND SYSTEM FOR NR BEAM ALIGNMENT

(71) Applicant: Nokia Technologies Oy, Espoo (FI)

(72) Inventors: Simon Svendsen, Aalborg (DK); Samantha Caporal Del Barrio, Aalborg (DK); Nuno Manuel Kiilerich Pratas, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 381 days.

(21) Appl. No.: 18/220,435

(22) Filed: Jul. 11, 2023

(65) Prior Publication Data

US 2024/0023178 A1 Jan. 18, 2024

(30) Foreign Application Priority Data

Jul. 12, 2022 (EP) .................................... 22184414

(51) Int. Cl.

*H04W 24/08* (2009.01)
*H04W 24/10* (2009.01)
*H04W 72/044* (2023.01)
*H04W 72/25* (2023.01)
(Continued)

(52) U.S. Cl.

CPC ........... *H04W 24/10* (2013.01); *H04W 24/08* (2013.01); *H04W 72/046* (2013.01);
(Continued)

(58) Field of Classification Search

CPC .... H04B 7/02–12; H04B 17/0082–409; H04L 5/0001–0098; H04W 4/30–80;
(Continued)

(56) References Cited

U.S. PATENT DOCUMENTS

2019/0393946 A1 12/2019 Guo et al.
2021/0126726 A1 4/2021 Parkvall et al.
(Continued)

FOREIGN PATENT DOCUMENTS

EP 3 057 179 A1 8/2016
EP 3 726 740 A1 10/2020
(Continued)

OTHER PUBLICATIONS

EESR (22184414.5) Nov. 29, 2022, 9 pgs.
(Continued)

*Primary Examiner* — Timothy J Weidner
(74) *Attorney, Agent, or Firm* — Lippes Mathias LLP

(57) ABSTRACT

Inter-alia, a method is disclosed comprising: receiving a beam report information indicative of quality information about at least one of at least one beam of a first set of sidelink, SL beam management reference signals, -BMRS, or at least one beam of a second set of SL-BMRS; determining whether the beam report information is indicative of quality information of at least one beam of the first set of SL-BMRS or of at least one beam of the second set of SL-BMRS, or a combination of at least two beams of the first set of SL-BMRS and the second set of SL-BMRS; and attempting to establish or establishing communication based on the beam report information. It is further disclosed an according apparatus, computer program and system.

14 Claims, 5 Drawing Sheets

(51) Int. Cl.

| | |
|---|---|
| ***H04W 76/14*** | (2018.01) |
| ***H04W 76/23*** | (2018.01) |
| ***H04W 84/02*** | (2009.01) |
| ***H04W 88/02*** | (2009.01) |
| ***H04W 92/18*** | (2009.01) |

(52) U.S. Cl.
CPC ........... *H04W 72/25* (2023.01); *H04W 76/14* (2018.02); *H04W 76/23* (2018.02); *H04W 84/02* (2013.01); *H04W 88/02* (2013.01); *H04W 92/18* (2013.01)

(58) Field of Classification Search
CPC ... H04W 24/02–10; H04W 72/02–569; H04W 76/10–50; H04W 84/005–22; H04W 88/02–06; H04W 92/16–18
See application file for complete search history.

(56) References Cited

U.S. PATENT DOCUMENTS

| | | | | |
|---|---|---|---|---|
| 2022/0046631 | A1 | 2/2022 | Li et al. | |
| 2023/0126503 | A1* | 4/2023 | Ökvist ................. | H04B 7/0695 |
| 2023/0361955 | A1* | 11/2023 | Ganesan .............. | H04B 7/0695 |
| 2023/0389055 | A1* | 11/2023 | Svendsen ........... | H04B 7/06956 |

FOREIGN PATENT DOCUMENTS

| | | |
|---|---|---|
| WO | WO 2020/113246 A1 | 6/2020 |
| WO | WO 2021/034572 A1 | 2/2021 |
| WO | WO 2021/234217 A1 | 11/2021 |

OTHER PUBLICATIONS

3GPP TR 38.802 (version 14.2.0) 144 pgs—Jul. 2019—section 6.1.6.

3GPP TS 38.214 (version 16.5.0) 171 pgs—Mar. 2021—section 5.2.

Kose et al. “Beam-Based Mobility Management in 5G Millimetre Wave V2X Communications: A Survey and Outlook”, IEEE Open Journal of Intelligent Transportation Systems, V. 2, Sep. 14, 2021, p. 347-363.

Fokin, “Bearing Measurement with Beam Sweeping for Positioning in 5G Networks”, IEEE Microwave Theory and Techniques in Wireless Communications (MTTW), Oct. 7-8, 2021.

* cited by examiner

METHODS, APPARATUSES AND SYSTEM FOR NR BEAM ALIGNMENT

FIELD

The following disclosure relates to the field of wireless communications, or more particularly relates to systems, apparatuses, and methods comprising beam alignment for New Radio (NR) sidelink (SL) communication(s) between user equipments (UEs).

BACKGROUND

A conventional beam management procedure between a base station (such as gNB) and a terminal device (such as UE) is described in third generation partnership project (3GPP) specification. Here, the UE beam management is defined in three phases: Phase #1, Phase #2 and Phase #3. These phases can be described as follows:

Phase #1 (P1):

A respective UE uses a broad receive (Rx) beam while the gNB is performing Synchronization Signal bursts where Synchronization Signal/Physical Broadcast Channel (PBCH) blocks (SSBs) are swept and transmitted in different angular directions covering the cell. The UE measures the reference signal received power (RSRP) for all SSB beams on all UE panels and sends a preamble for random access over the physical random access channel (PRACH) on the random access channel (RACH) occasion of the best SSB beam to connect to the network with the reciprocal transmit (Tx) beam of the best SSB beam.

Phase #2 (P2):

The UE uses a broad Rx beam to receive the gNB refined Downlink Channel State Information Reference Signal (DL CSI-RS) beam sweeping within the connected SSB beam. The UE measures the RSRP for all CSI-RS beams and reports the best beam ID(s) back to gNB still using the reciprocal broad Tx beam.

Phase #3 (P3):

The gNB transmits a repeated CSI-reference signal with the selected beam based on the UE reporting in Phase #2 and the UE sweeps refined Rx beam settings to identify its best narrow Rx beam. At the end of Phase #3, the beam alignment between the gNB Tx beam and the UE Rx beam is obtained enabling maximized directional gain.

One of the steps in SL beam management (and also in Uu) is an initial beam-pairing (also referred to as Phase 1) and further alignment with a narrower Tx beam (also referred to as Phase #2). Taking as basis a Uu beam management procedure (i.e. between a gNB and a UE, as described above with Phase #1 to Phase #3), then the SL initial beam-pairing between a so-called primary UE, P-UE, and a secondary UE, S-UE could occur.

The S-UE applies a wide beam for its reception and transmission. Therefore, at the end of the initial beam pairing a combination of P-UE narrow beam(s) and S-UE wide beam(s) may have been identified. In case there is a need to identify a narrow beam e.g. for the S-UE, then e.g. additional beam sweeps may be required to be performed from the S-UE side. These sweeps can be Tx based (i.e. the S-UE transmits different beams and then the P-UE reports back what is the best beam) or Rx based (i.e. the S-UE applies different Rx beams to the P-UE transmission, with the assumption that the P-UE applied beam does not change).

SUMMARY OF SOME EXEMPLARY EMBODIMENTS

However, such an initial beam alignment may require utilizing sidelink-beam management reference signals, SL-BMRS, more specifically SL-BMRS beams from both a wide beam group and a narrow beam group.

The inventors realized it might be useful to enable a solution for a case in which such SL-BMRS beams could be utilized from one beam group, and not from the other, e.g. from a wide beam group, and not from a narrow beam group, or vice versa, or no SL-BMRS beams are received at all.

According to a first exemplary aspect, a method is disclosed, the method comprising:

receiving a beam report information indicative of quality information about at least one of at least one beam of a first set of sidelink, SL beam management reference signals, -BMRS, or at least one beam of a second set of SL-BMRS;

determining whether the beam report information is indicative of quality information of at least one beam of the first set of SL-BMRS or of at least one beam of the second set of SL-BMRS, or a combination of at least two beams of the first set of SL-BMRS and the second set of SL-BMRS; and attempting to establish or establishing communication based on the beam report information.

This method may for instance be performed and/or controlled by an apparatus, for instance a terminal device, a user equipment, or a user device. For instance, the method may be performed and/or controlled by using at least one processor of the terminal device, user equipment, or user device. Such a terminal device, user equipment, or user device may also be referred to as primary-UE (P-UE) in the following. The apparatus may comprise or be connectable to multiple antenna panels or antenna elements.

According to a second exemplary aspect, a method is disclosed, the method comprising:

transmitting a beam report information indicative of a quality information about at least one of at least one received beam of a first set of sidelink, SL, beam management reference signals, -BMRS, or at least one received beam of a second set of SL-BMRS; and attempting to establish or establishing communication.

This method may for instance be performed and/or controlled by an apparatus, for instance a terminal device, a user equipment, or a user device. For instance, the method may be performed and/or controlled by using at least one processor of the terminal device, user equipment, or user device. Such a terminal device, user equipment, or user device may also be referred to as secondary-UE (S-UE) in the following. The apparatus may comprise or be connectable to at least one antenna panel or antenna element.

According to a further exemplary aspect, a computer program is disclosed, the computer program when executed by a processor causing an apparatus, for instance a terminal device, a user equipment, or a user device to perform and/or control the actions of the method according to at least one of the first or second exemplary aspect.

The computer program may be stored on computer-readable storage medium, in particular a tangible and/or non-transitory medium. The computer readable storage medium could for example be a disk or a memory or the like.

The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect, an apparatus is disclosed, configured to perform and/or control or comprising respective means for performing and/or controlling the method according to at least one of the first or second exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect, an apparatus is disclosed, comprising at least one processor and at least one memory storing instructions that, when executed by the at least one processor, cause an apparatus, for instance the apparatus, at least to perform and/or to control the method according to at least one of the first or second exemplary aspect.

The above-disclosed apparatus according to any aspect may be a module or a component for a device, for example a chip. Alternatively, the disclosed apparatus according to any aspect may be a device, for instance a server or server cloud. The disclosed apparatus according to any aspect may comprise only the disclosed components, for instance means, processor, memory, or may further comprise one or more additional components.

According to a further exemplary aspect, a system is disclosed, comprising:

an apparatus according to the first exemplary aspect as disclosed above, and one or more apparatuses according to the second exemplary aspect as disclosed above.

Any disclosure herein relating to any exemplary aspect is to be understood to be equally disclosed with respect to any subject-matter according to the respective exemplary aspect, e.g. relating to an apparatus, a method, a computer program, and a computer-readable medium. Thus, for instance, the disclosure of a method step shall also be considered as a disclosure of means for performing and/or configured to perform the respective method step. Likewise, the disclosure of means for performing and/or configured to perform a method step shall also be considered as a disclosure of the method step itself. The same holds for any passage describing at least one processor; and at least one memory including computer program code; the at least one memory and the computer program code configured to, with the at least one processor, cause an apparatus at least to perform a step.

For convenience, a list of abbreviations used in the following is already given at this point:

BMRS Beam Management Reference Signals
CE Control Element
CSI Channel State Information
CSI-RS Channel State Information Reference Signal
CQI Channel Quality Indicator
EIRP Effective Isotropic Radiated Power
FR1 Frequency Range (e.g. 410 MHz-7125 MHz)
FR2 Frequency Range (e.g. 24.25 GHz-52.6 GHz)
gNB next Generation Node B
MAC Medium Access Channel
NR New Radio
NW Network
PRACH Physical Random Access Channel
PMI Precoding Matrix Indicator
PSCCH Physical Sidelink Control Channel
PSSCH Physical Sidelink Shared Channel
PSFCH Physical Sidelink Feedback Channel
RACH Random Access Channel
RF Radio Frequency
RI Rank Indicator
RSRP Reference Signal Received Power
Rx Receive/Receiver
SC Sidelink Control Information
SL Sidelink
SL-BMRS Sidelink Beam Management Reference Signal(s)
SSB Synchronization Signal/PBCH Block
Tx Transmit/Transmitter
UE User Equipment (also referred to as user device)
V2X Vehicle-to-Anything In the following, exemplary features and exemplary embodiments of all aspects will be described in further detail.

Any of the disclosed apparatuses (according to the first and/or according to the second exemplary aspect) may be a stationary device or a mobile device. The apparatuses may in particular be a mobile device, such as a smartphone, a tablet, a wearable, a smartwatch, a low power device, an IoT device, an IIoT device, a XR (Virtual Reality (VR)/Augmented Reality (AR)/Mixed Reality (MR)) device, a vehicle, a truck, a drone, an airplane, or the like, or comprised by such a device (e.g. comprised by a vehicle, or a truck). The apparatus (e.g. according to the first and/or according to the second exemplary aspect) may in particular be capable of communicating with (transmitting and receiving signals and/or data to/from) one or more other apparatuses (e.g. according to the second or according to the first exemplary aspect, depending on whether the apparatus transmitting and receiving signals is of the first or second exemplary aspect) and/or a network device, such as a base station of a communication network. Generally, the respective apparatus(es) may also be any device enabled for communication with a communication network and/or another terminal device. A respective apparatus according to the first and/or second exemplary aspect may for instance be used in a V2X-communication.

The apparatus according to the first exemplary aspect and the apparatus according to the second exemplary aspect may be in certain proximity to each other, such that a direct communication via SL i.e. without a base station being involved, is possible. The apparatus according to the first and/or the apparatus according to the second exemplary aspect may in addition or in the alternative be served by the same or different cells of the communication network and/or of one or more base stations, if any, or at least one of the apparatuses may be out of coverage (i.e. temporarily not served by any cell(s)). It is noted, that while the example embodiments according to all exemplary aspects provided herein are described with respect to the apparatus according to the first exemplary aspect and/or the second exemplary aspect, the apparatus according to the second exemplary aspect, vice versa the apparatus according to the first exemplary aspect may of course be in SL communication with various other apparatuses, so that a respective apparatus (e.g a P-UE or a S-UE) can act both as an apparatus according to the first exemplary aspect and as an apparatus according to the second exemplary aspect. Accordingly, the apparatus according to the first (or second) exemplary aspect may then perform the described steps/actions with respect to multiple apparatuses according to the second (or first) exemplary aspect. For instance, the apparatus according to the first exemplary aspect may receive beam report information from multiple (e.g at least two) apparatuses according to the second exemplary aspect. The apparatus according to the first and the apparatus according to the second exemplary aspect may together form a respective SL network.

A respective apparatus according to the first exemplary aspect may receive a beam report information e.g from a respective apparatus according to the second exemplary aspect. A respective beam report information is indicative of quality information about at least one of at least one beam of a first set of sidelink, SL beam management reference signals, -BMRS, or at least one beam of a second set of SL-BMRS. The beam report information may be indicative of one or two quality information. In case of one quality information of which the beam report information is indicative of, the respective quality information is indicative of at least one beam of the first set of SL-BMRS, or of at least one beam of the second set of SL-BMRS. In case of the beam report information being indicative of two (e.g pieces) of beam report information, one (e.g piece) of quality information is indicative of at least one beam of the first set of SL-BMRS and the other (e.g piece) of quality information is indicative of at least one beam of the second set of SL-BMRS.

As used herein, the term SL Beam Management Reference Signal(s) (BMRS) is used to refer to one or more sequences to be used to aid on the beam alignment. However, these sequences can also be referred to as Beam Alignment Reference Sequence (BARS), or SL Channel State Information (CSI).

Quality information, as used herein, may be understood as information at least indicative of a respective SL-BMRS or information enabling to identify such a respective SL-BMRS, e.g of the first set of SL-BMRS and/or of the second set of SL-BMRS. The expression SL-BMRS beam, as used herein, may also be understood to be utilized to transmit/receive such a respective SL-BMRS, thus, signal.

Based, at least in part, on the received beam report information, the apparatus according to the first exemplary aspect determines whether the beam report information is indicative of quality information of at least one beam of the first set of SL-BMRS or of at least one beam of the second set of SL-BMRS, or a combination of at least two beams of the first set of SL-BMRS and the second set of SL-BMRS. Thus, the received beam report information may not necessarily be indicative of at least two beams of the first set of SL-BMRS and/or of the second set of SL-BMRS. Also, the beam report information may be indicative of quality information of at least one beam of first set of SL-BMRS and at least one beam of the second set of SL-BMRS, thus, in sum of at least two beams. Further, the beam report information may be indicative of quality information of none SL-BMRS at all. The expression "indicative of" may be understood that a respective beam report information comprises information enabling to determine a respective beam of the first set of SL-BMRS and/or of the second set of SL-BMRS. Thus, e.g. an indicator such as a bit or combination of bits that is suitable to identify such a respective beam may be sufficient.

Further, based on the beam report information, the apparatus according to the first exemplary aspect attempts to establish or establishes communication, in particular via SL or as SL communication, in particular with the apparatus from which the apparatus of the first exemplary aspect has received the beam report information, e.g. the apparatus according to the second exemplary aspect. The expression "attempting to establish" may for instance be understood that the apparatus and the other apparatus with which the communication is attempted to be established interact and agree with each other how the communication is established, in particular which apparatus is in charge of setting up the communication or establishing the communication, to name but one non-limiting example. Thus, attempting to establish the communication may be understood that the actual establishing of the communication occurs on part of the apparatus from which the apparatus of the first exemplary aspect has received the beam report information.

According to an example embodiment of all exemplary aspects, the first set of SL-BMRS corresponds to a wide beam group. Such a wide beam group may comprise at least one wide beam. The wide beam group may be indicative of at least one wide SL-BMRS beam.

A respective wide beam of the wide beam group may refer to a beam that is transmittable or receivable by an antenna element or antenna panel comprised by or connectable to the apparatus of the first exemplary aspect or the second exemplary aspect Such a wide beam may be transmitted or emitted in all angular directions that the respective antenna element or antenna panel can transmit or emit the respective beam.

According to an example embodiment of all exemplary aspects, the second set of SL-BMRS corresponds to a narrow beam group. The narrow beam group may comprise at least one first narrow beam and at least one second narrow beam. The narrow beam group may be indicative of at least a first narrow SL-BMRS beam and a second narrow SL-BMRS beam, wherein a respective narrow beam is narrower than at least one SL-BMRS wide beam of the wide beam group.

Contrary to a respective wide beam of the wide beam group, a respective narrow beam of the narrow beam group is transmittable or emittable in a narrower angular direction than the respective wide beam. Thus, in other words, a respective wide beam is transmittable or emittable (e.g. by the apparatus of the first exemplary aspect) in such a way that an entire area of a coverage area in which signals or beams transmitted or emitted by the respective antenna element or antenna panel can then be observed. A respective narrow beam may in contrast then not be observable throughout this (e.g entire) coverage area (covered by a respective wide beam) which potentially could be served by the respective antenna element or antenna panel. The one or more SL-BMRS beams of the narrow beam group together, however and when transmitted or emitted (e.g. in a sequential manner), may however also cover the entire coverage area in which signals or beams transmitted or emitted by the respective antenna element or antenna panel can then be observed (e.g. received).

Thus, the quality information of the beam report information may be indicative of (e.g. the) at least one received wide SL-BMRS beam, and/or indicative of (e.g the) at least one received narrow SL-BMRS beam. The respective SL-BMRS beam(s) may be observed (e.g received) by a respective apparatus of the second exemplary aspect. The quality information may represent such a respective wide or narrow (or both) SL-BMRS beam that was (were) received with a highest RSRP, Reference Signal Received Power, compared to other received SL-BMRS beams (e.g. by the apparatus of the second exemplary aspect). The apparatus of the second exemplary aspect may e.g include in a respective beam report information that the apparatus of the second exemplary aspect provides (e.g sends) to the apparatus of the first exemplary aspect respective quality information about at least one beam of the first set of SL-BMRS and/or of the second set of SL-BMRS, if the apparatus of the second exemplary aspect has received one or more SL-BMRS beam from one or two BMRS beam groups, respectively.

For instance, at least one wide beam, and at least one first and at least one second narrow beam may be transmitted or emitted as disclosed above by the apparatus of the first exemplary aspect. Then, e.g the apparatus of the second exemplary aspect may observe (e.g. receive) such beam(s) enabling the apparatus of the second exemplary aspect to measure the respective signal strength(s). The apparatus according to the second exemplary aspect may provide (e.g send) a respective beam report information back to the apparatus according to the first exemplary aspect based on the result of the measuring. In the respective beam report information, the best measured beam in the wide beam group and/or in the narrow beam group may be indicated and/or comprised so that the respective beam(s) are identifiable by the apparatus of the first exemplary aspect. This may allow the apparatus according to the first exemplary aspect to determine (e.g extract) from the received beam report information a/the best narrow beam of the second set of SL-BMRS, e.g belonging to the first set of SL-BMRS. The term "best" as used herewith may refer to a respective beam of the first set of SL-BMRS (e.g wide beam group) and/or of the second set of SL-BMRS (e.g narrow beam group) that was received by the apparatus according to the second exemplary aspect with a highest received signal power, to name but one non-limiting example.

In other words, a respective P-UE (e.g apparatus of the first exemplary aspect) may receive a beam report information indicative of quality information of one or more SL-BMRS beams from one and/or two different beam groups, or none at all. In the latter case, the respective P-UE may not receive a respective beam report information. Thus, a respective P-UE may receive a beam report information indicative of quality information of SL-BMRS (e.g only) from the wide beam group. A respective P-UE may receive a beam report information indicative of quality information of SL-BMRS (e.g only) from the narrow beam group, or from both groups.

According to an exemplary embodiment of the first exemplary aspect, the method further comprises:

transmitting at least one beam of the first set (e.g wide beam group) of sidelink, SL-BMRS, and/or at least one beam of the second set (e.g narrow beam group) of SL-BMRS;

wherein the first set of SL-BMRS is transmitted on at least one of multiple antenna panels or an antenna elements comprised by or connectable to the apparatus, and wherein the second set of SL-BMRS is transmitted simultaneously on at least two of the multiple antenna panels or antenna elements.

In particular, at least one beam of the first set (e.g wide beam group) of SL-BMRS, and at least one beam of the second set (e.g narrow beam group) of SL-BMRS are transmitted. For instance, the apparatus of the first exemplary aspect may comprise or be connectable to four antenna panels and/or antenna elements, so that via these antenna elements or antenna panels, (e.g wide) beams in four different directions of the apparatus may be transmitted or emitted.

For this, a respective wide beam group may have e.g. four SL-BMRS beams defined, e.g SL-BMRS #1-4. The wide beam group may define that a respective wide SL-BMRS beam corresponds to a single antenna panel or antenna element of e.g. all antenna elements of antenna panels of the apparatus according to the first exemplary aspect. In other words, a respective wide SL-BMRS beam corresponds to a wide SL-BMRS beam within a respective antenna panel or antenna element of the apparatus according to the first exemplary aspect.

Further, a respective narrow beam group may have e.g seven SL-BMRS beams defined, e.g. SL-BMRS #5-11. The narrow beam group may define that a respective narrow SL-BMRS beam corresponds to a single antenna panel or antenna element of the apparatus according to the first exemplary aspect, and when the respective beams (e.g. SL-BMRS #5 to SL-BMRS #11) are put together, the narrow SL-BMRS beams cover the coverage area of a single wide beam.

Then, in particular in addition to the four wide SL-BMRS beams, the apparatus according to the first exemplary aspect (e.g a P-UE) may transmit (e.g send) a respective (e.g wide) SL BMRS sequentially on each wide beam, e.g SL-BMRS #1-4 as part of the wide beam group.

The apparatus according to the first exemplary aspect (e.g. a P-UE) may transmit (e.g. send) simultaneously (e.g not simultaneous to a respective wide SL-BMRS) a respective narrow beam, e.g. starting with narrow SL-BMRS beam SL-BMRS #5 as part of the narrow beam group from (e.g. all) antenna elements or antenna panels. A respective narrow beam (e.g SL-BMRS #5) may be transmitted simultaneously on (e.g all) antenna elements or antenna panels of the apparatus of the first exemplary aspect.

According to an exemplary embodiment of the first exemplary aspect, the method further comprises:

using a best narrow SL-BMRS beam (e.g determined by the apparatus of the second exemplary aspect) for attempting to establish or establishing communication in one or more SL communications with one or more secondary UEs, user equipments (e.g apparatus(es) of the second exemplary aspect).

The best narrow SL-BMRS beam may be determined, e.g by overlapping a/the beam radiation pattern of the best wide beam with the beam radiation pattern of the best narrow beam.

According to an exemplary embodiment of the first exemplary aspect, if determined that the beam report information is indicative of quality information of at least two beams of both the first set of SL-BMRS and the second set of SL-BMRS, the communication is attempted to be established or established via at least one beam of the second set of SL-BMRS belonging to at least one of multiple antenna panels or antenna elements used for a transmitting of the at least one beam of the second set of SL-BMRS.

Thus, it may be determined if the beam report information is indicative of quality information of at least one beam of both the first set of SL-BMRS and the second set of SL-BMRS. Also, it may be determined if the beam report information is indicative of quality information of at least two beams, one beam for the first set of SL-BMRS and one beam for the second set of SL-BMRS.

According to an exemplary embodiment of the second exemplary aspect, if the beam report information is indicative of quality information of at least two beams, the communication is attempted to be established or established via at least one beam of the second set of SL-BMRS belonging to at least one of multiple antenna panels or an antenna elements comprised by or connectable to the apparatus via which the at least one beam of the second set of SL-BMRS was received (e.g prior to the transmitting of the beam report information, this information is comprised by the beam report information that is transmitted).

As disclosed above, the beam report information can be indicative of quality information of at least two beams of both the first set of SL-BMRS and the second set of SL-BMRS which may be understood to mean that the beam report information comprises or is indicative of at least one beam of the first set of SL-BMRS and in addition at least one beam of the second set of SL-BMRS.

In this scenario, the apparatus of the first exemplary aspect has received and verified that the beam report information comprises or is indicative of quality information of at least one beam of the second set (e.g narrow beam group) of SL-BMRS. Further, the apparatus of the first exemplary aspect has received and verified that the beam report information comprises or is indicative of quality information of at least one beam of the first set (e.g wide beam group) of SL-BMRS. This may enable the apparatus of the first exemplary aspect e.g to selected a correct (e.g best or most suitable) narrow beam for a (e.g SL) communication. Thus, the apparatus of the first exemplary aspect can attempt to establish or establish (e.g SL) communication via a respective SL-BMRS belonging to the second set of SL-BMRS.

For instance, the apparatus of the first exemplary aspect (e.g. P-UE) can conclude that a respective apparatus of the second exemplary aspect attempts to establish communication via a respective beam of the second set of SL-BMRS based on the received beam report information. Further the apparatus of the first exemplary aspect can determine (e.g. derive or conclude) a respective antenna panel or antenna element, in particular the one as indicated by a respective beam of the first set of SL-BMRS of which the beam report information is indicative of. For instance, the apparatus of the first exemplary aspect may determine which respective antenna panel or antenna element was used to transmit or emit the respective beam that is then indicated in the received beam report information.

According to an exemplary embodiment of the first exemplary aspect, if determined that the beam report information is not indicative of quality information of at least two beams of both the first set of SL-BMRS and the second set of SL-BMRS, the method further comprises:

starting a timer, e.g. to check whether e.g. after the timer has elapsed, a respective beam report information is received or not.

With and/or by using a timer, the apparatus of the first exemplary aspect is configured to wait e.g a pre-determined time duration and then evaluate if a respective beam report information is received that may then be indicative of at least one beam of the first set of SL-BMRS and at least one beam of the second set of SL-BMRS.

Otherwise, the respectively received beam report information may be indicative of quality information of at least one beam of the first set of SL-BMRS and at least one beam of the second set of SL-BMRS so that there is no need for the apparatus of the first exemplary aspect to wait for another beam report information.

For instance, in case the received beam report information is not indicative of quality information of respective beams of both the first set of SL-BMRS and the second set of SL-BMRS, the apparatus of the first exemplary aspect may start a timer. The apparatus of the first exemplary aspect may then determine whether the (e.g. current) timer has expired or not. During the timer is running, the apparatus of the first exemplary aspect may wait for a next SL identification message (e.g. in the form of or comprising a respective beam report information) from a respective apparatus of the second exemplary aspect. If the timer has expired, the apparatus of the first exemplary aspect can determine whether the (e.g missing) SL identification (e.g that the respective beam report information is indicative of quality information of at least one beam of both the first set of SL-BMRS and the second set of SL-BMRS) is included in or comprised by the last received SL identification message.

According to an exemplary embodiment of the first exemplary aspect, the method further comprises:

if determined that the beam report information is indicative of quality information of one beam of the first set (e.g. wide beam group) of SL-BMRS, the communication is attempted to be established or established via at least one beam of the first set of SL-BMRS belonging to at least one of multiple antenna panels or antenna elements used for a transmitting of the at least one beam of the first set of SL-BMRS; and searching for one or more beams of the second set of SL-BMRS by sequentially transmitting (e.g one or more narrow beams, and correspondingly observing such signals by the other apparatus) on the at least one of multiple antenna panels or antenna elements to establish the communication.

According to an exemplary embodiment of the second exemplary aspect, the method further comprises:

if the beam report information is indicative of quality information of one beam of the first set of SL-BMRS, the communication is attempted to be established or established via at least one beam of the first set of SL-BMRS belonging to at least one of multiple antenna panels or antenna elements via which the at least one beam of the first set of SL-BMRS was received.

The searching for one or more beams of the second set of SL-BMRS may be performed and/or controlled by the apparatus of the first exemplary aspect transmitting the respective one or more (e.g narrow) SL-BMRS beams of the second set of SL-BMRS. This searching may be done on the respective antenna panel or antenna element that was used to transmit a respective (e.g. wide) SL-BMRS beam of the first set of SL-BMRS and which corresponding quality information may be indicated in the beam report information received by the apparatus of the first exemplary aspect.

For instance, the searching (e.g thus, the actual transmission of the respective one or more (e.g narrow) SL-BMRS beams of the second set of SL-BMRS, e.g via the identified (e.g based on the received beam report information) antenna panel or antenna element) may be done with an increased EIRP so that a likelihood that the respective beam is observable (e.g by an apparatus of the second exemplary aspect) is higher or enhanced compared to a/the respective beam being transmitted earlier without such an increased EIRP. If such an apparatus of the second exemplary aspect observes a respective beam, the apparatus may provide a respective beam report information in response that can then be received by the apparatus of the first exemplary aspect.

According to an exemplary embodiment of the first exemplary aspect, the method further comprises:

if determined that the beam report information is indicative of quality information of one beam of the second set of SL-BMRS, the communication is attempted to be established or established via at least one beam of the second set of SL-BMRS belonging to at least one of multiple antenna panels or antenna elements used for a transmitting of the at least one beam of the second set of SL-BMRS; and searching for one or more beams of the second set of SL-BMRS sequentially on the at least one (e.g in particular all or each) of multiple antenna panels or antenna elements to establish the communication.

According to an exemplary embodiment of the second exemplary aspect, the method further comprises:

if the beam report information is indicative is indicative of quality information of one beam of the second set of SL-BMRS, the communication is attempted to be established or established via at least one beam of the second set of SL-BMRS belonging to at least one of multiple antenna panels or antenna elements via which the at least one beam of the second set of SL-BMRS was received.

The searching may be performed and/or controlled by the apparatus of the first exemplary aspect in a same or the equal manner as disclosed above.

According to the example embodiment of above, if a received beam report information is indicative of quality information of at least one beam of the second set of SL-BMRS (e.g narrow beam group) but not of at least one beam of the first set of SL-BMRS, the apparatus of the first exemplary aspect may search or wait for (e.g another) beam report information that can then be indicative of quality information of the first set of beam report information, e.g by listening to potential channel(s) via which a respective beam may be received.

For instance, based, at least in part, on the received beam report information, the apparatus of the first exemplary aspect (e.g P-UE) may determine whether the apparatus of the first exemplary aspect has received a respective SL BMRS identification for (e.g which the received beam report information is indicative of) at least one wide beam and/or at least one narrow beam.

If the beam report information is indicative of at least one narrow beam, the apparatus of the first exemplary aspect can determine (e.g derive or assume) that a respective S-UE (e.g apparatus of the second exemplary aspect from which the beam report information was received) attempts to establish a communication or to communicate on a respective antenna panel or antenna element corresponding to the respective wide beam as indicated in the beam report information. Further, if the apparatus of the first exemplary aspect has not received any feedback (e.g in the form of a respective beam report information) on one or more beams of the second set of SL-BMRS (e.g narrow beams), the apparatus of the first exemplary aspect may sent sequentially narrow beam BMRSs on a specific antenna panel or antenna element. These respective beams may be sent with higher EIRP as only a single BMRS is now required and sent at a given point in time.

If the beam report information is indicative of at least one narrow beam, the apparatus of the first exemplary aspect can determine (e.g derive or assume) that a respective S-UE (e.g apparatus of the second exemplary aspect from which the beam report information was received) attempts to establish a communication or get initial access on a narrow beam of the second set of SL-BMRS beam as indicated in the beam report information. Further, the apparatus of the first exemplary aspect may sent sequentially narrow beam SL-BMRSs for (e.g each of) the narrow beams belonging to the second set of SL-BMRS (e.g. one narrow beam for each panel at or comprised by or connectable to the apparatus of the first exemplary aspect). These respective narrow SL-BMRSs may be sent with higher EIRP as a single BMRS is required at a time, as already disclosed above.

The apparatus of the first exemplary aspect may perform and/or control the searching. The respective searching may yield in a positive result (e.g. the apparatus has received (e.g another) beam report information) so that a (e.g SL communication) via such identified beams can be established. Therefore, e.g a respective beam report information is transmitted to the apparatus from which the respective beam(s) stem and were identified during the searching.

According to an exemplary embodiment of the first exemplary aspect, the method further comprises:

obtaining or defining a beam sweep configuration indicative of at least the first set of SL-BMRS (e.g wide beam group) and the second set of SL-BMRS (e.g narrow beam group); and transmitting a respective SL-BMRS beam of the first set of SL-BMRS and a respective SL-BMRS beam of the second set of SL-BMRS based, at least in part, on the beam sweep configuration, wherein a respective SL-BMRS beam of the first set of SL-BMRS is transmitted on at least one of multiple antenna panels or an antenna elements comprised by or connectable to the apparatus, and wherein a respective SL-BMRS beam of the second set of SL-BMRS is transmitted simultaneously on at least two of the multiple antenna panels or antenna elements.

The beam sweep configuration may comprise or be indicative of the first set of SL-BMRS and the second set of SL-BMRS. The beam sweep grouping may be defined by the apparatus of the first exemplary aspect (e.g P-UE), as the apparatus of the first exemplary aspect knows its own antenna panel or antenna element capabilities, such as number of antenna panels or antenna elements, and/or number of different angular directions in which the apparatus of the first exemplary aspect can transmit or emit a respective (e.g narrow) beams (in particular: a respective narrow SL-BMRS beam) per antenna panel or antenna element.

In addition or in the alternative, a respective beam sweep configuration may be obtained, by receiving the beam sweep configuration, e.g from a network node, such as a network device (e.g a gNB), or from another UE, e.g. via a SL communication, to name but a few non-limiting examples. It will be understood that in such a case, e.g. the apparatus of the first exemplary aspect may have provided (e.g previously) such information indicative about the apparatus' antenna panel or antenna element capabilities. The transmission of a/the respective beam(s) of the first set of SL-BMRS, and/or of a/the respective beam(s) of the second set of SL-BMRS may be performed and/or controlled based, at least in part, on such a beam sweep configuration.

According to an exemplary embodiment of the first exemplary aspect, the beam sweep configuration is provided (e.g sent, e.g to an apparatus of the second exemplary aspect) via at least one of a SL SCI, Sidelink Control Information, a SL MAC CE, sidelink medium access control control element, or a RRC, radio resource control, signalling.

According to an exemplary embodiment of the second exemplary aspect, the beam sweep configuration is obtained (e.g. received from an apparatus of the first exemplary aspect) via at least one of a SL SCI, Sidelink Control Information, a SL MAC CE, sidelink medium access control control element, or a RRC, radio resource control, signalling.

Thus, such a beam sweep configuration may be provided to the apparatus according to the first and/or second exemplary aspect e.g. by a MAC CE or PC5 RRC signalling or as a part of a resource pool configuration, e.g as used for FR2 resource pools, to name but a few non-limiting example.

The apparatus of the second exemplary aspect may transmit a respective beam report information indicative of a quality information about at least one of at least one received beam of a first set of sidelink, SL, beam management reference signals, -BMRS, or at least one received beam of a second set of SL-BMRS so that the apparatus of the first exemplary aspect can receive the beam report information. Further, the apparatus of the second exemplary aspect attempts to establish or establishes communication with another apparatus (e.g the apparatus of the first exemplary aspect (e.g. a P-UE)) from which the apparatus of the second exemplary aspect may have received one or more beams of a first set of SL-BMRS and of a second set of SL-BMRS.

According to an exemplary embodiment of the second exemplary aspect, the communication is attempted to be established or is established via at least one of multiple antenna panels or an antenna elements comprised by or connectable to the apparatus in accordance with the beam report information.

The respective methods of the first and/or the second exemplary may allow that in case a respective P-UE does not receive from a respective S-UE feedback on a respective SL-BMRS beam in both beam groups, e.g the wide beam group and the narrow beam group, that all of the following and possible outcomes of which a respectively received beam report information of the P-UE may be indicative of can be addressed/handled:

- The apparatus of the first exemplary aspect may receive a beam report information indicative of quality information of a respective SL-BMRS from both beam groups (e.g the wide beam group and the narrow beam group);
- The apparatus of the first exemplary aspect may receive a beam report information indicative of quality information of a SL-BMRS (e.g only) from the wide (also referred to as broad) beam group; and
- The apparatus of the first exemplary aspect may receive a beam report information indicative of quality information of a SL-BMRS (e.g only) from the narrow beam group.

The features and example embodiments described above may equally pertain to the different aspects.

It is to be understood that the presentation in this section is merely by way of examples and non-limiting.

Other features will become apparent from the following detailed description considered in conjunction with the accompanying drawings. It is to be understood, however, that the drawings are designed solely for purposes of illustration and not as a definition of the limits, for which reference should be made to the appended claims. It should be further understood that the drawings are not drawn to scale and that they are merely intended to conceptually illustrate the structures and procedures described herein.

DETAILED DESCRIPTION OF SOME EXEMPLARY EMBODIMENTS

The following description serves to deepen the understanding and shall be understood to complement and be read together with the description as provided in the above summary section of this specification.

Figure 1:
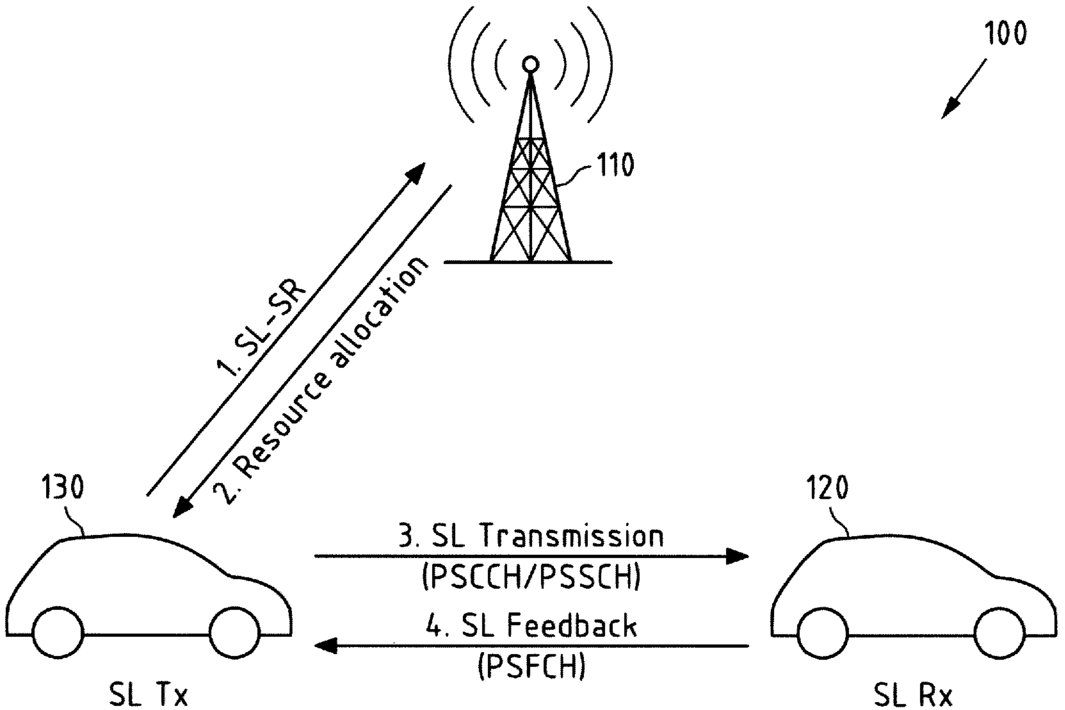
FIG. 1 a schematic block diagram of a system according to an exemplary aspect, e.g in an example radio environment in which exemplary embodiments may be performed.

FIG. 1 is a schematic high-level block diagram of a system 100 that may enable one or more of the disclosed example embodiments according to all exemplary aspects.

The scenario shown in FIG. 1 illustrates that a UE, e.g. SL Rx UE 120 may want to establish a SL communication with another UE, e.g SL Tx UE 130 e.g. since the latter may have connectivity to a mobile communication network—exemplary shown by the base station 110, so that via the SL Tx UE 130 the SL Rx UE 120 can uphold connectivity. Additionally or alternatively, also SL Tx UE 130 may want to exchange data with SL Rx UE 120. In this case, SL Tx UE 130 may want to establish a SL communication with SL Rx UE 120 as well, to name but a few non-limiting examples.

NR sidelink (SL) has been designed to facilitate a respective UE to communicate with other nearby UE(s) via direct/SL communication. Two resource allocation modes have been specified, and a SL transmitter (Tx) UE is configured with one of them to perform its NR SL transmissions. These modes are denoted as NR SL mode 1 and NR SL mode 2. In mode 1, a sidelink transmission resource is assigned (scheduled) by the network (NW) to the SL Tx UE, while a SL Tx UE in mode 2 autonomously selects its SL transmission resources.

In mode 1, where a respective network device (e.g a gNB) is responsible for the SL resource allocation (see arrow "2. Resource allocation" between base station 110 and SL Tx 130), the configuration and operation is similar to the one over the Uu interface. This may be done based on a SL scheduling Request, SR (see arrow "1. SL-SR" between SL Tx 130 and base station 110). Then, a SL transmission (on PSCCH and/or PSSCH) may occur between SL Tx 130 and SL Rx 120 (see arrow "3. SL Transmission). The SL Rx 120 may provide feedback back to SL Tx 130 (see arrow "4. SL Feedback"), e.g on the feedback channel PSFCH.

In mode 2, the SL UEs 120 and 130 may perform autonomously the resource selection with the aid of a sensing procedure. More specifically, a SL Tx UE in NR SL mode 2 first performs a sensing procedure over the configured SL transmission resource pool(s), in order to obtain the knowledge of the reserved resource(s) by other nearby SL UE(s). Based on the knowledge obtained from sensing the SL Tx UE may select resource(s) from the available SL resources, accordingly. In order for a SL UE to perform sensing and obtain the necessary information to receive a SL transmission, it needs to decode the sidelink control information (SCI). Such SCI associated with a data transmission includes a 1st-stage SCI and 2nd-stage SCI.

The SCI may follow a 2-stage SCI structure, whose main motivation is to support the size difference between the SCIs for various NR-V2X SL service types (e.g broadcast, groupcast and unicast).

The 1st-stage SCI, SCI format 1-A, carried by PSCCH and may contain or comprise:

- information to enable sensing operations (e.g in the form of a beam sweep configuration); and
- information needed to determine resource allocation of the PSSCH and to decode 2nd-stage SCI.

The 2nd-stage SCI, SCI format 2-A and 2-B, carried by PSSCH (multiplexed with SL-SCH) and may contain or comprise:

- source and destination identities:
- information to identify and decode the associated SL-SCH TB:
- control of HARQ feedback in unicast/groupcast; and
- trigger for CSI feedback in unicast.

The configuration of the resources in the SL resource pool may define the minimum information required for a respective SL Rx UE to be able to decode a transmission, which includes the number of sub-channels, the number of PRBs per sub-channels, the number of symbols in the PSCCH, which slots have a PSFCH and other configuration aspects not relevant to this invention.

However, the details of the actual SL transmission (i.e., the payload) is provided in the PSCCH (1st-stage SCI) for (e.g each) individual transmission, which may include: the time and frequency resources, the DMRS configuration of the PSSCH, the MCS, PSFCH, among others.

The configuration of the PSCCH (e.g, DMRS, MCS, number of symbols used) may be a part of the resource pool configuration. Furthermore, the indication of which slots have PSFCH symbols is also part of the resource pool configuration. However, the configuration of the PSSCH (e.g., the number of symbols used, the DMRS pattern and the MCS) is provided by the 1st-stage SCI which is the payload sent within the PSCCH.

For NR Sidelink communications, beam management support (e.g comprising initial beam alignment) for SL when operating in FR2 is to be achieved. Increased SL data rate is motivated by applications such as sensor information (video) sharing between vehicles with high degree of driving automation. Commercial use cases could require also higher data rates. Increased data rate can be achieved with the support of SL carrier aggregation and SL over unlicensed spectrum. Furthermore, by enhancing the FR2 sidelink operation, increased data rate can be more efficiently supported on FR2. While the support of new carrier frequencies and larger bandwidths may allow to improve its data rate, this may further allow to make SL more applicable for a wider range of applications. More specifically, with the support of unlicensed spectrum and the enhancement in FR2, sidelink will be in a better position to be implemented in commercial devices since utilization of the ITS band is limited to ITS safety related applications.

Example embodiments of all exemplary aspects may thus allow that a respective P-UE (e.g. SL Tx UE 130; apparatus according to the first exemplary aspect) receiving from S-UE (e.g SL Rx UE 120; apparatus according to the second exemplary aspect) a beam report information e.g indicative of quality information about at least one of at least one SL-BMRS beam of a respective wide beam group, or at least one SL-BMRS beam of a respective narrow beam group. Further, in case a respectively received beam report information is not indicative of respective SL-BMRS for both beam groups, e.g. the respective P-UE receives a SL-BMRS (e.g. only) for the wide beam group; or the respective P-UE receives a SL-BMRS (e.g. only) from the narrow beam group, or did not receive any beam report information or a beam report information that is not indicative of either a SL-BMRS of the wide beam group or the narrow beam group, this may be handled as disclosed in the summary section above by example embodiments of the first and/or second exemplary aspect. By allowing the respective P-UE to determine (e.g detect) whether a connecting/connected S-UE is understanding and has detected SL-BMRSs from one or both beam groups, or from none beam group at all, the sidelink beam alignment procedure is enhanced in particular in that it is not required that each received beam report information necessarily is indicative of quality information of both a wide beam group and a narrow beam group.

Figure 5:
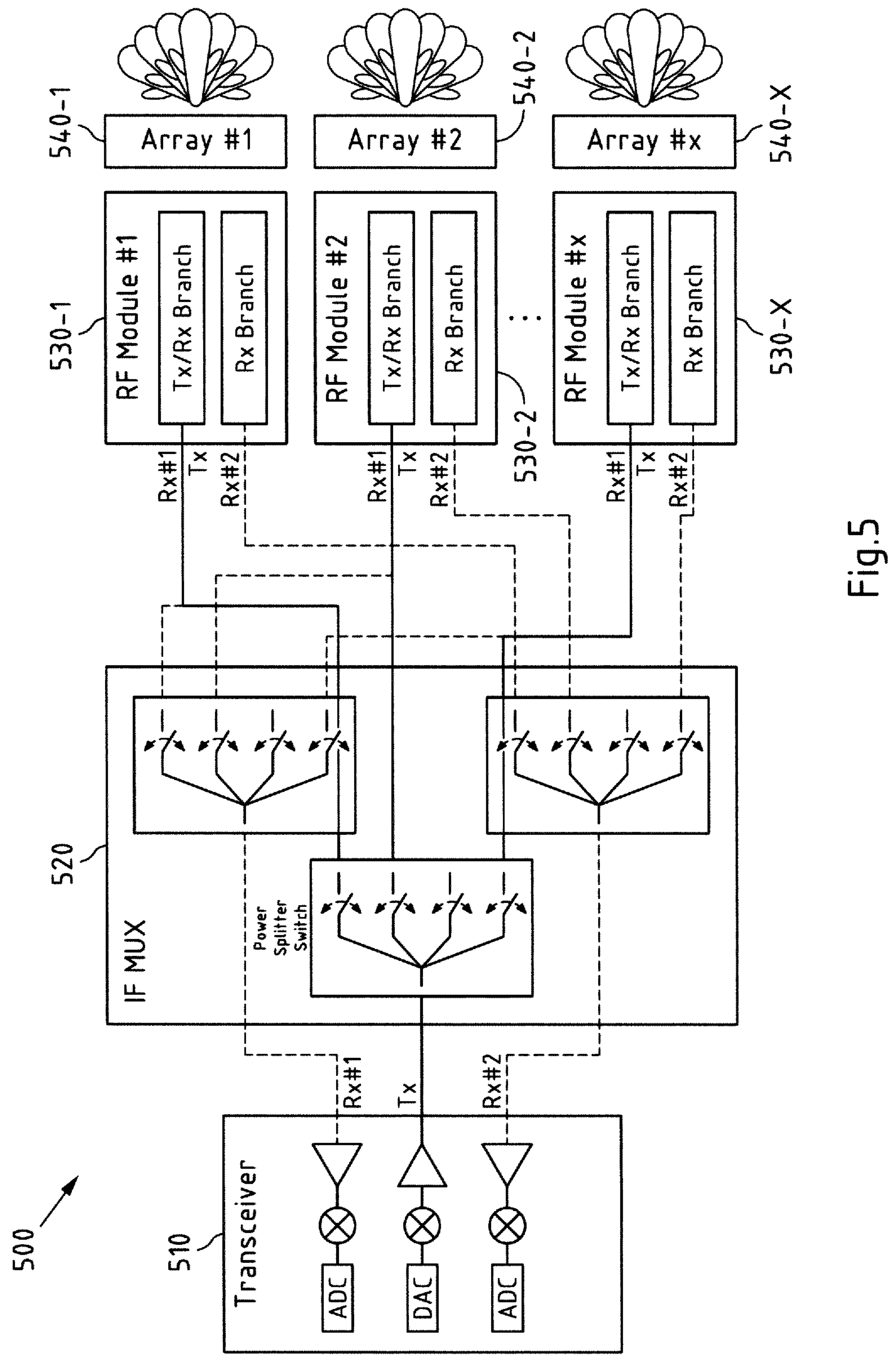
FIG. 5 an example of compatible RF hardware architecture as comprisable by an apparatus according to the first or second exemplary aspect.

Thus, example embodiments of all exemplary aspects may further allow one or more aspects as follows:

- The enhanced sidelink procedure may (e.g. only) require an RF architecture supporting a single layer TX channel (see FIG. 5). Thus, it may be valid for low-cost UEs:
- Reduced number of RS (overhead) due to the enhanced BM (between a factor of 1.8 to 3.3) depending on number of connecting S-UEs may be enabled:
- Reduced alignment time to reach P-UE narrow beam is achieved:
- Enhanced coverage of P-UE is provided:
- Low and fixed number of needed SL-BMRS to perform Phase #1 and Phase #2 of initial beam alignment is enabled. This may be independent of the number of S-UE communicating with the P-UE. The benefit may also scale the higher the cell load; and
- A single report may (e.g only) be needed sent from a respective S-UE to a respective P-UE at the end of the two group sweeps, in contrast with the two reports needed in the baseline scheme.

Figures 2, 3:
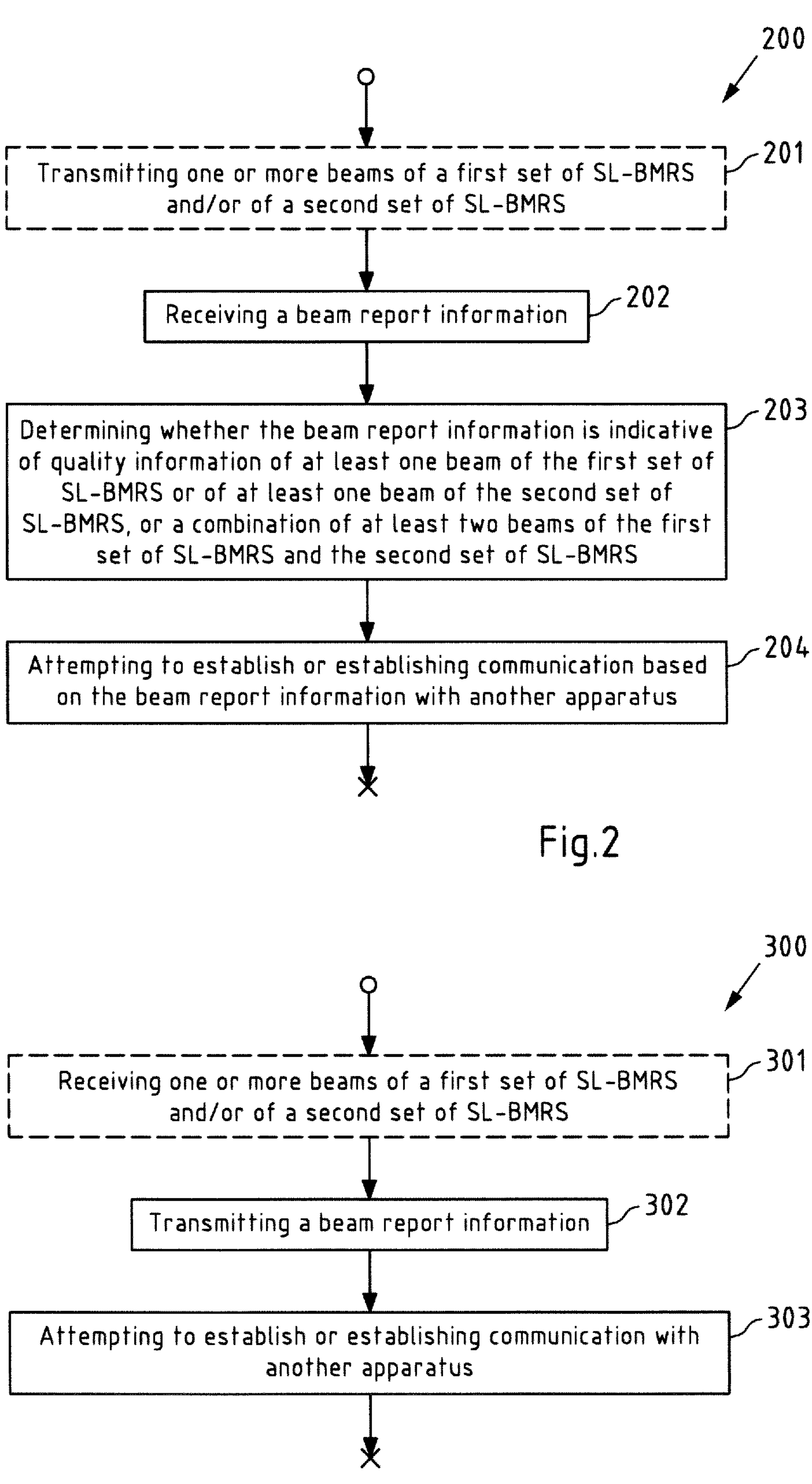
FIG. 2 a flowchart showing an example embodiment of a method according to the first exemplary aspect.
FIG. 3 a flowchart showing an example embodiment of a method according to the second exemplary aspect.

FIG. 2 is a flowchart 200 showing an example embodiment of a method according to the first exemplary aspect. This flowchart 200 may for instance be performed by a UE, e.g SL Tx UE 130 or SL Rx UE 120 of FIG. 1. This flowchart 200 may for instance be performed by such a UE acting as a respective P-UE.

In an optional first step 201, a first set of SL-BMRSs, e.g. comprising at least one wide beam based on a wide beam group is transmitted. The at least one wide beam may be transmitted based, at least in part, on a beam sweep configuration. Further, a second set of SL-BMRS, e.g. comprising at least one first narrow beam and, further, e.g subsequently at least one second narrow beam based on a narrow beam group is transmitted. The at least one narrow beam may be transmitted based, at least in part, on the beam sweep configuration.

In a second step 202, a respective beam report information is received. The beam report information may be received from a UE performing and/or controlling flowchart 300 of FIG. 3. Such a UE may have determined the beam report information based on the transmitted/sent one or more beams of step 201.

In a third step 203, whether the beam report information is indicative of quality information of at least one beam of the first set of SL-BMRS or of at least one beam of the second set of SL-BMRS, or a combination of at least two beams of the first set of SL-BMRS and the second set of SL-BMRS is determined. The determining may allow the respective UE performing and/or controlling the flowchart 200 to perform and/or control one or more steps/actions in case the beam report information of step 202 is not indicative of at least one beam of the first set of SL-BMRS (e.g. wide beam group) and at least one beam of the second set of SL-BMRS (e.g narrow beam group).

In a fourth step 204, based on the beam report information, communication with another apparatus (in particular the apparatus from which the beam report information of step 202 is received) is attempted to be established or established.

FIG. 3 is a flowchart 300 showing an example embodiment of a method according to the second exemplary aspect. This flowchart 300 may for instance be performed by a UE, e.g SL Rx UE 120 or SL Tx UE 130 of FIG. 1.

In an optional first step 301, a first set of SL-BMRS, e.g comprising at least one wide beam based on a wide beam group is received. The at least one wide beam may be transmitted by an apparatus according to the first exemplary aspect, see step 201 of FIG. 2. Further, a second set of SL-BMRS, e.g comprising at least one first narrow beam and, subsequently at least one second narrow beam based on a narrow beam group is received. The at least one first narrow beam and, subsequently the at least one second narrow beam may be transmitted by an apparatus according to the first exemplary aspect performing and/or controlling the flowchart 200 of FIG. 2, see step 201 of FIG. 2.

In a second step 302, the beam report information is provided, e.g by sending it to a respective UE from which in step 301 the respective beams may have been received.

In a third step 303, communication with another apparatus (in particular the apparatus to which the beam report information of step 302 is provided) is attempted to be established or established.

Figure 4:
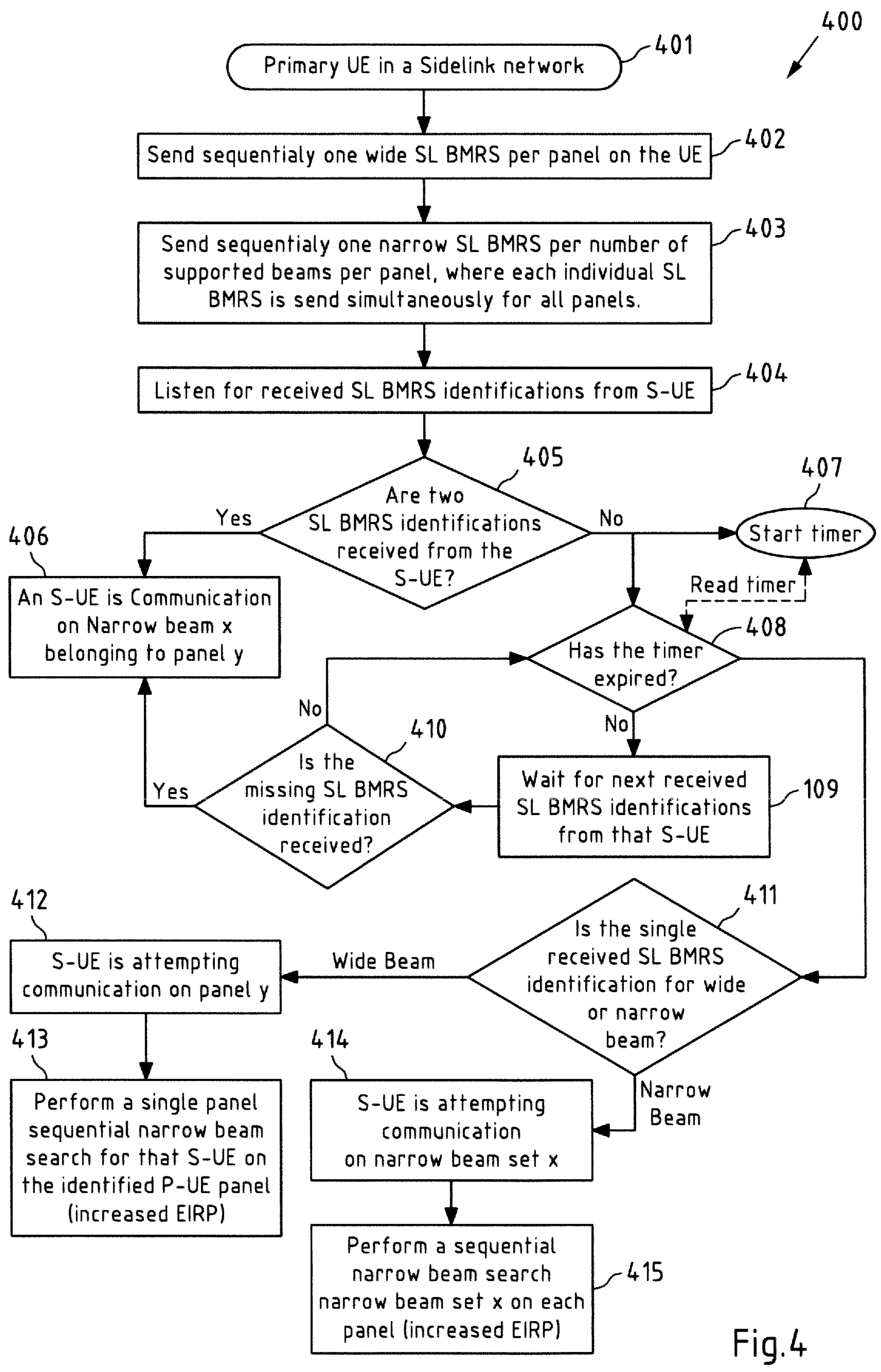
FIG. 4 another flowchart showing an example embodiment according to all exemplary aspects.

FIG. 4 shows another flowchart showing an example embodiment according to all exemplary aspects.

A respective P-UE may receive a beam report information indicative of quality information of a respective SL-BMRS beam from a respective first set of SL-BMRS (e.g. wide beam group), and of a respective SL-BMRS beam from a respective second set of SL-BMRS (e.g narrow beam group). However, the beam report information received by the respective P-UE may be indicative of quality information of a respective SL-BMRS beam of the respective first set of SL-BMRS beams, only. In the alternative, the beam report information received by the respective P-UE may be indicative of quality information of a respective SL-BMRS beam of the respective second set of SL-BMRS, only. In another alternative, the beam report information received by the respective P-UE may not be indicative of any quality information.

Step 1, 401:

The UE is a primary UE (P-UE; e.g SL Tx UE 130 of FIG. 1) of a Unicast Sidelink connection in a SL network with a secondary UE (S-UE, e.g SL Rx UE 120 of FIG. 1). The P-UE may define or be configured with two different beam groups and in addition may include such information in a configuration exchanged between the P-UE and a respective S-UE (e.g via a MAC CE or PC5 RRC signaling) or as a part of a resource pool configuration for FR2 resource pools, to name but a few non-limiting examples.

Step 2, 402:

The P-UE may send sequentially one (e.g wide) SL-BMRS beam of the first set of SL-BMRS with a wide beam on each antenna panel or antenna element that may be comprised by or connectable to the P-UE.

Step 3, 403:

The P-UE may further send sequentially (e.g narrow) SL-BMRS beams of the second set of SL-BMRS for each supported beam per antenna panel or antenna element that may be comprised by or connectable to the P-UE. The same BMRS (e.g. in the form of a beam) may be sent simultaneously via each antenna panel or antenna element that may be comprised by or connectable to the P-UE.

Step 4, 404:

The P-UE may listen for SL BMRS identifications (e.g comprised by a respective beam report information) from the secondary UE (S-UE) so that the P-UE can receive such a beam report information steming from the S-UE.

Step 5, 405:

If the P-UE has received a respective beam report information, the P-UE may determine, based at least in part on the beam report information, if the P-UE has received SL BMRS identifications for both sets of SL-BMRS (e.g. beam groups, in particular the wide beam group and the narrow beam group).

- If yes (P-UE has received SL BMRS identifications for both sets), the flowchart 400 continues with step 6 (406).
- If no, the flowchart 400 continues with step 7 (407) and step 8 (408).

Step 6, 406:

The P-UE may conclude that the S-UE is attempting to establish or establishing communication on a certain beam set x on a certain panel y. This may be determined (e.g. derived or concluded) at least in part on the received beam report information and/or knowledge via which antenna panel or antenna element previously a respective SL-BMRS beam was sent (see e.g. step 2 (402) and step 3 (403)).

Step 7, 407:

The P-UE may start a timer.

Step 8, 408:

The P-UE may determine if a current timer (e.g. the timer started in step 7 (407)) has expired or not.

- If yes, the flowchart 400 continues with step 11 (411).
- If no, the flowchart 400 continues with step 9 (409).

Step 9, 409:

The P-UE may wait for a/the next SL identification message that the P-UE may receive in the form of respective beam report information from the respective S-UE, since it may be missing in the beam report information that the P-UE may have received previously.

Step 10, 410:

The P-UE may determine whether the missing SL identification is included in the last received SL identification message or not.

- If yes, the flowchart 400 continues with step 6 (406).
- If no, the flowchart 400 continues with step 8 (408).

Step 11, 411:

The P-UE may determines whether the P-UE has received a SL BMRS identification for a wide or narrow beam, or not.

- If the P-UE determines that the received beam report information is indicative of quality information of a respective wide SL-BMRS beam, the flowchart 400 continues with step 12 (412).
- If the P-UE determines that the received beam report information is indicative of quality information of a respective narrow SL-BMRS beam, the flowchart 400 continues with step 14 (414).

Step 12, 412:

The respective S-UE may attempt to establish or establish communication or to communicate with the P-UE on or via a certain antenna panel or antenna element y. This may for instance be the antenna panel or antenna element on which a respective SL-BMRS beam was received previously with a highest RSRP, and which information may be correspondingly be indicated back to the P-UE via the provided beam report information (see step 4 (404)).

Step 13, 413:

The P-UE may sent sequentially one or more narrow SL-BMRS beam(s) on panel y. These BMRS can be sent with an increased EIRP as only a single BMRS is required at a time.

Step 14, 414:

The S-UE may be attempting to establish or establish communication with the P-UE, e.g via an initial access procedure that may be performed and/or controlled on a certain narrow beam set x.

Step 15, 415:

The P-UE may sent sequentially one or more narrows SL-BMRS beam(s) for each of the narrow beams (of the second set of SL-BMRS beams, e.g narrow beam group), e.g. belonging to the respective beam set x. Thereby, one narrow beam may be transmitted by the P-UE via each antenna panel or antenna element at the P-UE. These respective SL-BMRS beams may be sent with an increased EIRP as now, (e.g. only) a single SL-BMRS beam may be required at a time. With may enhance the likelihood that the respective SL-BMRS can be observed by the respective S-UE.

Thus, as shown, the procedure of flowchart 400 for a respective P-UE in a SL network enables to perform an enhanced beam alignment procedure based on two different beam groups and zero, one or two BMRS identifications from a respective S-UE. Accordingly, since the steps 1 to 15 (401 to 415) are disclosed in particular for or from the perspective of a respective P-UE, it will be understood that according steps/actions may be performed and/or controlled by a respective S-UE interacting with the P-UE which are thus also disclosed. Example embodiments may allow a combining of wide and narrow beam sweeps to enhance coverage. Further, the disclosed procedure for the P-UE may be suitable in situations where the P-UE may (e.g only) receive one BMRS identification (e.g comprised by a respective beam report information) from the S-UE. Further, the P-UE may providing respectively a best beam towards the S-UE, e.g in the event that (e.g only) a single SL-BMRS beam is transmitted/sent. This may allow to e.g prevent failures that may otherwise occur e.g in case a received beam report information is not indicative of quality information of at least one beam of both the first set of SL-BMRS and the second set of SL-BMRS.

FIG. 5 shows an example of compatible RF hardware architecture 500 as comprisable by, or connectable to an apparatus according to the first or second exemplary aspect. In case a respective UE, (e.g. P-UE or S-UE) comprises one or more of the shown hardware architecture, it may be enabled to perform and/or control example embodiments of the enhanced sidelink procedure according to all exemplary aspects.

The shown hardware architecture may in particular relate to RF hardware. The RF hardware architecture 500 may for instance comprise a transceiver 510, an Intermediate Frequency (IF) multiplexer (MUX) 520, a plurality (e.g at least two) of RF modules 530-1, 530-2 to 530-*x* that are connected to a respective antenna panel or antenna element 540-1, 540-2 to 540-*x*. The respective antenna panel or antenna element 540-1, 540-2 to 540-*x* may be enabled to transmit or emit one or more SL-BMRS beams in a certain angular direction and with a certain emitting power, to name but two controllable parameters.

Current FR2 products typically assume a single Tx chain, i.e. single DAC e.g for cost/space reasons. The RF hardware architecture 500 is able to configure a respective Tx path and the Rx paths (one Rx path for each polarization of the antenna array may be given) to a single antenna panel (e.g of an antenna array) as for legacy operation, but in addition also enables the option to divide a/the Tx signal between all of the antenna panels that may be implemented by such an RF architecture.

In the example of such a RF hardware architecture 500 shown in FIG. 5, where the Tx and Rx paths may be switched to a single antenna array or divided/combined at the IF MUX 520, the power/splitter/switch component within the IF MUX 520 can be implemented in different ways, but the function is the same. Such a power/splitter/switch component may allow a controllable component with a single pole that can be switched to one of multiple throws or divided between all or a subset of throws.

The setting of the controllable power/splitter/switch component may be as follow with reference to the flowchart shown in FIG. 4:

- single throw setting of the controllable power/splitter/switch component, as disclosed in conjunction with step 2 (reference sign 402 of FIG. 4), step 13 (reference sign 413 of FIG. 4) and Step 15 (reference sign 415 of FIG. 4); and/or
- multiple throw setting of the controllable power/splitter/switch component, as disclosed in conjunction with step 3 (reference sign 403 of FIG. 4) and step 4 (reference sign 404 of FIG. 4).

Figure 6:
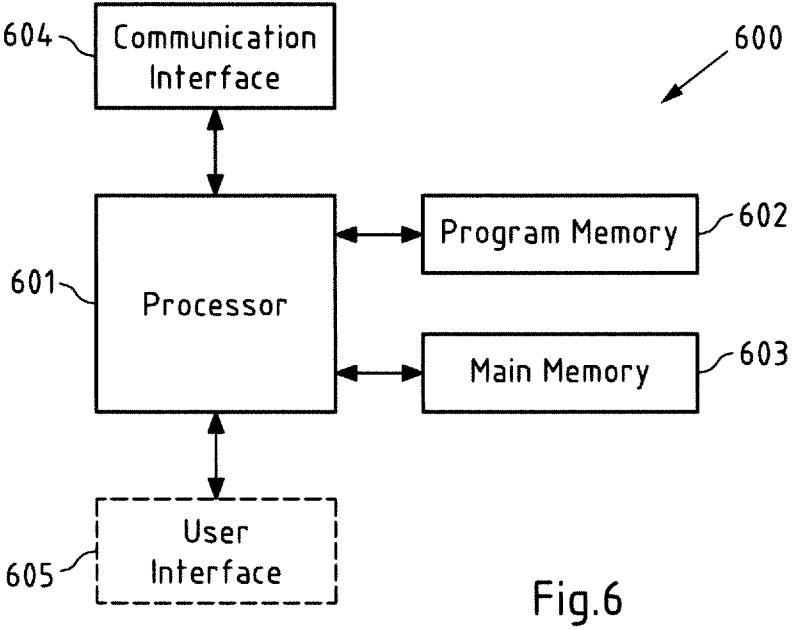
FIG. 6 a schematic block diagram of an apparatus configured to perform the method according to at least one of the first or second exemplary aspect.

FIG. 6 is a schematic block diagram of an apparatus 600 according to the first or second example aspect Apparatus 600 may for instance represent the P-UE (e.g SL Tx UE 130 of FIG. 1) or S-UE (e.g. SL Rx UE 120 of FIG. 1).

Apparatus 600 comprises a processor 601, a program memory 602, a main memory 603, communication interface(s) 604, and a user interface 605. In various embodiments, the apparatus 600 comprises further units, parts or structural and/or functional elements. In various embodiments, apparatus 600 is a user equipment, e.g., for a cellular network like 5G NR.

Apparatus 600 may for instance be configured to perform and/or control or comprise respective means (at least one of 601 to 605) for performing and/or controlling and/or configured to perform the method according to the first or second example aspect. Apparatus 600 may as well constitute an apparatus comprising at least one processor 601 and at least one memory 602 including computer program code, the at least one memory 602 and the computer program code configured to, with the at least one processor 601, cause an apparatus, e.g. apparatus 600 at least to perform and/or control the method according to the first or second example aspect.

Processor 601 may for instance further control the memories 602 to 603, and/or the communication interface(s) 904.

Processor 601 may for instance execute computer program code stored in program memory 602, which may for instance represent a computer readable storage medium comprising program code that, when executed by processor 601, causes the processor 601 to perform the method according to the first or second example aspect.

Processor 601 (and also any other processor mentioned in this specification) may be a processor of any suitable type. Processor 601 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 601 may for instance be an application processor that runs an operating system.

Program memory 602 may also be included into processor 601. This memory may for instance be fixedly connected to processor 601, or be at least partially removable from processor 601, for instance in the form of a memory card or stick. Program memory 602 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 602 may also comprise an operating system for processor 601. Program memory 602 may also comprise a firmware for apparatus 600.

Apparatus 600 may comprise a working or main memory 603, for instance in the form of a volatile memory. It may for instance be a Random Access Memory (RAM) or Dynamic RAM (DRAM), to give but a few non-limiting examples. It may for instance be used by processor 601 when executing an operating system and/or computer program.

Data memory (not shown) may for instance be a non-volatile memory. It may for instance be a FLASH memory (or a part thereof), any of a ROM, PROM, EPROM and EEPROM memory (or a part thereof) or a hard disc (or a part thereof), to name but a few examples.

Communication interface(s) 604 enable apparatus 600 to communicate with other entities, e.g. with one or more of the apparatuses 110, 120, 130 of FIG. 1 and/or one or more of the apparatus 420, 430, 530-*a*, 530*b* of FIGS. 4 and 5, and/or network devices, e.g. of the same network. The communication interface(s) 604 may for instance comprise a wireless interface, e.g. a cellular radio communication interface and/or a WLAN interface) and/or wire-bound interface, e.g. an IP-based interface, for instance to communicate with entities via the Internet or a network backbone, e.g. a 5G NR backbone.

Sensor(s) (not shown) are optional and may for instance comprise a gyroscope, global positioning system sensor or a received signal strength sensor.

User interface 605 is optional and may comprise a display for displaying information to a user and/or an input device (e.g. a keyboard, keypad, touchpad, mouse, etc.) for receiving information from a user.

Some or all of the components of the apparatus 600 may for instance be connected via a bus. Some or all of the components of the apparatus 600 may for instance be combined into one or more modules.

Furthermore, at least the following embodiments should be considered to be specifically disclosed:

Embodiment 1

A method comprising:

receiving a beam report information indicative of quality information about at least one of at least one beam of a first set of sidelink, SL beam management reference signals, -BMRS, or at least one beam of a second set of SL-BMRS;

determining whether the beam report information is indicative of quality information of at least one beam of the first set of SL-BMRS or of at least one beam of the second set of SL-BMRS, or a combination of at least two beams of the first set of SL-BMRS and the second set of SL-BMRS; and attempting to establish or establishing communication based on the beam report information with another apparatus.

Embodiment 2

The method according to embodiment 1, wherein if determined that the beam report information is indicative of quality information of at least two beams of both the first set of SL-BMRS and the second set of SL-BMRS, the communication is attempted to be established or established via at least one beam of the second set of SL-BMRS belonging to at least one of multiple antenna panels or antenna elements used for a transmitting of the at least one beam of the second set of SL-BMRS.

Embodiment 3

The method according to embodiment 1 or embodiment 2, further comprising:

if determined that the beam report information is indicative of quality information of one beam of the first set of SL-BMRS, the communication is attempted to be established or established via at least one beam of the first set of SL-BMRS belonging to at least one of multiple antenna panels or antenna elements used for a transmitting of the at least one beam of the first set of SL-BMRS; and searching for one or more beams of the second set of SL-BMRS by sequentially transmitting on the at least one of multiple antenna panels or antenna elements to establish the communication.

Embodiment 4

The method according to any of the embodiments 1 to 3, further comprising:

if determined that the beam report information is indicative of quality information of one beam of the second set of SL-BMRS, the communication is attempted to be established or established via at least one beam of the second set of SL-BMRS belonging to at least one of multiple antenna panels or antenna elements used for a transmitting of the at least one beam of the second set of SL-BMRS; and searching for one or more beams of the second set of SL-BMRS sequentially on the at least one of multiple antenna panels or antenna elements to establish the communication.

Embodiment 5

The method according to any of the embodiments 1 to 4, wherein the first set of SL-BMRS corresponds to a wide beam group comprising at least one wide beam, wherein the wide beam group is indicative of at least one wide SL-BMRS beam.

Embodiment 6

The method according to embodiment 5, wherein the second set of SL-BMRS corresponds to a narrow beam group comprising at least one first narrow beam and at least one second narrow beam, wherein the narrow beam group is indicative of at least a first narrow SL-BMRS beam and a second narrow SL-BMRS beam, wherein a respective narrow beam is narrower than the at least one SL-BMRS wide beam of the wide beam group.

Embodiment 7

The method according to embodiment 5 or embodiment 6, further comprising:

obtaining or defining a beam sweep configuration indicative of at least the wide beam group and the narrow beam group; and transmitting a respective wide SL-BMRS beam of the wide beam group and a respective narrow SL-BMRS beam of the narrow beam group based, at least in part, on the beam sweep configuration, wherein a respective wide SL-BMRS beam of the wide beam group is transmitted on at least one of multiple antenna panels or an antenna elements, and wherein a respective narrow SL-BMRS beam of the narrow beam group is transmitted simultaneously on at least two of the multiple antenna panels or antenna elements.

Embodiment 8

The method according to embodiment 7, wherein the beam sweep configuration is provided (e.g. sent to an apparatus of the second exemplary aspect) via at least one of a SL SCI, Sidelink Control Information, a SL MAC CE, sidelink medium access control control element, or a RRC, radio resource control, signalling.

Embodiment 9

A method comprising:

transmitting a beam report information indicative of a quality information about at least one of at least one received beam of a first set of sidelink, SL, beam management reference signals, -BMRS, or at least one received beam of a second set of SL-BMRS; and attempting to establish or establishing communication with another apparatus.

Embodiment 10

The method according to embodiment 9, wherein the communication is attempted to be established or is established via at least one of multiple antenna panels or an antenna elements in accordance with the beam report information.

Embodiment 11

The method according to embodiment 9 or embodiment 10, wherein if the beam report information is indicative of quality information of at least two beams, the communication is attempted to be established or established via at least one beam of the second set of SL-BMRS belonging to at least one of multiple antenna panels or an antenna elements via which the at least one beam of the second set of SL-BMRS was received.

Embodiment 12

The method according to any of the embodiments 9 to 11, further comprising:

if the beam report information is indicative of quality information of one beam of the first set of SL-BMRS, the communication is attempted to be established or established via at least one beam of the first set of SL-BMRS belonging to at least one of multiple antenna panels or antenna elements via which the at least one beam of the first set of SL-BMRS was received.

Embodiment 13

The method according to any of the embodiments 9 to 12, further comprising:

if the beam report information is indicative is indicative of quality information of one beam of the second set of SL-BMRS, the communication is attempted to be established or established via at least one beam of the second set of SL-BMRS belonging to at least one of multiple antenna panels or antenna elements via which the at least one beam of the second set of SL-BMRS was received.

Embodiment 14

A first apparatus comprising respective means for performing the method of any of embodiments 1 to 8.

Embodiment 15

A first apparatus comprising at least one processor and at least one memory storing instructions that, when executed by the at least one processor, cause an apparatus at least to perform and/or control the method according any of embodiments 1 to 8.

Embodiment 16

A second apparatus comprising respective means for performing the method of any of embodiments 9 to 13.

Embodiment 17

A second apparatus comprising at least one processor and at least one memory storing instructions that, when executed by the at least one processor, cause an apparatus at least to perform and/or control the method according any of embodiments 9 to 13.

Embodiment 18

A computer program, the computer program when executed by a processor causing an apparatus, e.g. the apparatus according to any of embodiments 14 to 17, to perform and/or control the actions and/or steps of the method of any of embodiments 1 to 8.

Embodiment 19

A computer program product comprising a computer program according to embodiment 18.

Embodiment 20

A system comprising at least a first apparatus according to any of embodiments 14 or 15 and a second apparatus according to any of embodiments 16 or 17.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A. (ii) B, (iii) A and B. Having the same meaning as the expression "A and/or B", the expression "at least one of A or B" may be used herein. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The subject-matter has been described above by means of example embodiments. It should be noted that there are alternative ways and variations which are obvious to a skilled person in the art and can be implemented without deviating from the scope of the appended claims.

The invention claimed is:

1. An apparatus comprising:

at least one processor; and at least one memory storing instructions that, when executed by the at least one processor, cause the apparatus to:

transmit at least one beam of a first set of sidelink, SL, beam management reference signals, -BMRS, and at least one beam of a second set of SL-BMRS, wherein the first set corresponds to a wide beam group and the second set corresponds to a narrow beam group;

wherein the wide beam group comprises at least one wide beam, wherein the wide beam group is indicative of at least one wide SL-BMRS beam;

wherein the narrow beam group comprises at least one first narrow beam and at least one second narrow beam, wherein the narrow beam group is indicative of at least a first narrow SL-BMRS beam and a second narrow SL-BMRS beam, wherein a respective narrow beam is narrower than the at least one SL-BMRS wide beam of the wide beam group;

and wherein the apparatus is caused to obtain a beam sweep configuration indicative of at least the wide beam group and the narrow beam group, and transmit a respective wide SL-BMRS beam of the wide beam group and a respective narrow SL-BMRS beam of the narrow beam group based, at least in part, on the beam sweep configuration, wherein the respective wide SL-BMRS beam of the wide beam group is transmitted on at least one of multiple antenna panels or antenna elements comprised by or connectable to the apparatus, and wherein the respective narrow SL-BMRS beam of the narrow beam group is transmitted simultaneously on at least two of the multiple antenna panels or antenna elements;

receive a beam report information indicative of quality information about at least one of the at least one beam of the first set of SL-BMRS, or at least one beam of the second set of SL-BMRS;

wherein the beam report information comprises an indicator that is suitable to identify such at least one beam of at least one of the first set of SL-BMRS, or the second set of SL-BMRS;

determine whether the beam report information is indicative of quality information of at least one beam of the first set of SL-BMRS or of at least one beam of the second set of SL-BMRS, or a combination of at least two beams of the first set of SL-BMRS and the second set of SL-BMRS; and attempt to establish or establishing communication based on the beam report information with another apparatus.

2. The apparatus according to claim 1, wherein if determined that the beam report information is indicative of quality information of at least two beams of both the first set of SL-BMRS and the second set of SL-BMRS, the communication is attempted to be established or established via at least one beam of the second set of SL-BMRS belonging to at least one of multiple antenna panels or antenna elements used for a transmitting of the at least one beam of the second set of SL-BMRS.

3. The apparatus according to claim 1, further comprising:

if determined that the beam report information is indicative of quality information of one beam of the first set of SL-BMRS, the communication is attempted to be established or established via at least one beam of the first set of SL-BMRS belonging to at least one of multiple antenna panels or antenna elements used for a transmitting of the at least one beam of the first set of SL-BMRS; and the apparatus further comprises:

at least one processor; and at least one memory storing instructions that, when executed by the at least one processor, cause the apparatus to:

search for one or more beams of the second set of SL-BMRS by sequentially transmitting on the at least one of multiple antenna panels or antenna elements to establish the communication.

4. The apparatus according to claim 1, further comprising:

if determined that the beam report information is indicative of quality information of one beam of the second set of SL-BMRS, the communication is attempted to be established or established via at least one beam of the second set of SL-BMRS belonging to at least one of multiple antenna panels or antenna elements used for a transmitting of the at least one beam of the second set of SL-BMRS; and the apparatus further comprises:

at least one processor; and at least one memory storing instructions that, when executed by the at least one processor, cause the apparatus to:

search for one or more beams of the second set of SL-BMRS sequentially on the at least one of multiple antenna panels or antenna elements to establish the communication.

5. The apparatus according to claim 1, wherein the beam sweep configuration is provided via at least one of a SL SCI, Sidelink Control Information, a SL MAC CE, sidelink medium access control control element, or a RRC, radio resource control, signalling.

6. An apparatus comprising:

at least one processor; and at least one memory storing instructions that, when executed by the at least one processor, cause the apparatus to:

receive at least one beam of a first set of sidelink, SL, beam management reference signals, -BMRS, and at least one beam of a second set of SL-BMRS, wherein the first set corresponds to a wide beam group and the second set corresponds to a narrow beam group;

wherein the wide beam group comprises at least one wide beam, wherein the wide beam group is indicative of at least one wide SL-BMRS beam;

wherein the narrow beam group comprises at least one first narrow beam and at least one second narrow beam, wherein the narrow beam group is indicative of at least a first narrow SL-BMRS beam and a second narrow SL-BMRS beam, wherein a respective narrow beam is narrower than the at least one SL-BMRS wide beam of the wide beam group;

and wherein a beam sweep configuration is indicative of at least the wide beam group and the narrow beam group, the at least one received beam of the first set of SL-BMRS and the at least one received beam of the second set of SL-BMRS having been transmitted as a respective wide SL-BMRS beam of the wide beam group and a respective narrow SL-BMRS beam of the narrow beam group based, at least in part, on the beam sweep configuration, the respective wide SL-BMRS beam of the wide beam group having been transmitted on at least one of multiple antenna panels or antenna elements comprised by or connectable to a transmitting apparatus, and the respective narrow SL-BMRS beam of the narrow beam group having been transmitted simultaneously on at least two of the multiple antenna panels or antenna elements;

transmit a beam report information indicative of a quality information about at least one of the at least one received beam of the first set of SL, -BMRS, or at least one received beam of the second set of SL-BMRS;

wherein the beam report information comprises an indicator that is suitable to identify such at least one beam of at least one of the first set of SL-BMRS, or the second set of SL-BMRS; and attempt to establish or establishing communication with another apparatus.

7. The apparatus according to claim 6, wherein the communication is attempted to be established or is established via at least one of the multiple antenna panels or the antenna elements comprised by or connectable to the transmitting apparatus in accordance with the beam report information.

8. The apparatus according to claim 6, wherein if the beam report information is indicative of quality information of at least two beams, the communication is attempted to be established or established via at least one beam of the second set of SL-BMRS belonging to at least one of multiple antenna panels or antenna elements comprised by or connectable to the apparatus via which the at least one beam of the second set of SL-BMRS was received.

9. The apparatus according to claim 6, further comprising:

if the beam report information is indicative of quality information of one beam of the first set of SL-BMRS, the communication is attempted to be established or established via at least one beam of the first set of SL-BMRS belonging to at least one of multiple antenna panels or antenna elements via which the at least one beam of the first set of SL-BMRS was received.

10. The apparatus according to claim 6, further comprising:

if the beam report information is indicative is indicative of quality information of one beam of the second set of SL-BMRS, the communication is attempted to be established or established via at least one beam of the second set of SL-BMRS belonging to at least one of multiple antenna panels or antenna elements via which the at least one beam of the second set of SL-BMRS was received.

11. A method, comprising:

transmitting at least one beam of a first set of sidelink, SL, beam management reference signals, -BMRS, and at least one beam of a second set of SL-BMRS, wherein the first set corresponds to a wide beam group and the second set corresponds to a narrow beam group;

wherein the wide beam group comprises at least one wide beam, wherein the wide beam group is indicative of at least one wide SL-BMRS beam;

wherein the narrow beam group comprises at least one first narrow beam and at least one second narrow beam, wherein the narrow beam group is indicative of at least a first narrow SL-BMRS beam and a second narrow SL-BMRS beam, wherein a respective narrow beam is narrower than the at least one SL-BMRS wide beam of the wide beam group;

and wherein the method further comprises obtaining a beam sweep configuration indicative of at least the wide beam group and the narrow beam group, and the transmitting comprises transmitting a respective wide SL-BMRS beam of the wide beam group and a respective narrow SL-BMRS beam of the narrow beam group based, at least in part, on the beam sweep configuration, wherein the respective wide SL-BMRS beam of the wide beam group is transmitted on at least one of multiple antenna panels or antenna elements comprised by or connectable to a transmitting apparatus, and wherein the respective narrow SL-BMRS beam of the narrow beam group is transmitted simultaneously on at least two of the multiple antenna panels or antenna elements;

receiving a beam report information indicative of quality information about at least one of the at least one beam of the first set of SL, -BMRS, or at least one beam of the second set of SL-BMRS;

wherein the beam report information comprises an indicator that is suitable to identify such at least one beam of at least one of the first set of SL-BMRS, or the second set of SL-BMRS;

determining whether the beam report information is indicative of quality information of at least one beam of the first set of SL-BMRS or of at least one beam of the second set of SL-BMRS, or a combination of at least two beams of the first set of SL-BMRS and the second set of SL-BMRS; and attempting to establish or establishing communication based on the beam report information.

12. A non-transitory computer readable medium comprising program instructions that, when executed by a processor, cause an apparatus to perform the method of claim 11.

13. A method, comprising:

receiving at least one beam of a first set of sidelink, SL, beam management reference signals, -BMRS, and at least one beam of a second set of SL-BMRS, wherein the first set corresponds to a wide beam group and the second set corresponds to a narrow beam group, wherein the wide beam group comprises at least one wide beam, wherein the wide beam group is indicative of at least one wide SL-BMRS beam;

wherein the narrow beam group comprises at least one first narrow beam and at least one second narrow beam, wherein the narrow beam group is indicative of at least a first narrow SL-BMRS beam and a second narrow SL-BMRS beam, wherein a respective narrow beam is narrower than the at least one SL-BMRS wide beam of the wide beam group;

and wherein a beam sweep configuration is indicative of at least the wide beam group and the narrow beam group, the at least one received beam of the first set of SL-BMRS and the at least one received beam of the second set of SL-BMRS having been transmitted as a respective wide SL-BMRS beam of the wide beam group and a respective narrow SL-BMRS beam of the narrow beam group based, at least in part, on the beam sweep configuration, the respective wide SL-BMRS beam of the wide beam group having been transmitted on at least one of multiple antenna panels or antenna elements comprised by or connectable to a transmitting apparatus, and the respective narrow SL-BMRS beam of the narrow beam group having been transmitted simultaneously on at least two of the multiple antenna panels or antenna elements;

transmitting a beam report information indicative of a quality information about at least one of the at least one received beam of the first set of SL, -BMRS, or at least one received beam of the second set of SL-BMRS;

wherein the beam report information comprises an indicator that is suitable to identify such at least one beam of at least one of the first set of SL-BMRS, or the second set of SL-BMRS; and attempting to establish or establishing communication.

14. A non-transitory computer readable medium comprising program instructions that, when executed by a processor, cause an apparatus to perform the method of claim 13.

* * * * *